L. H. DES ISLES.
CABLE FOR THERMO ELECTRIC CIRCUITS OF GRAIN TANKS.
APPLICATION FILED JULY 24, 1918.
1,365,465.
Patented Jan. 11, 1921.
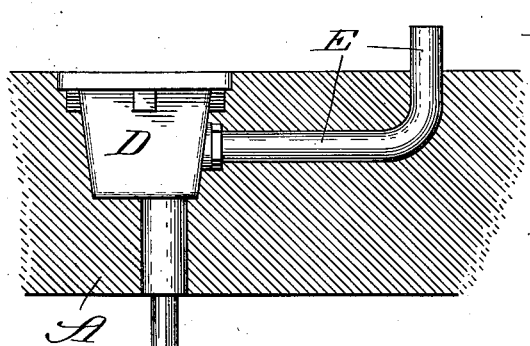
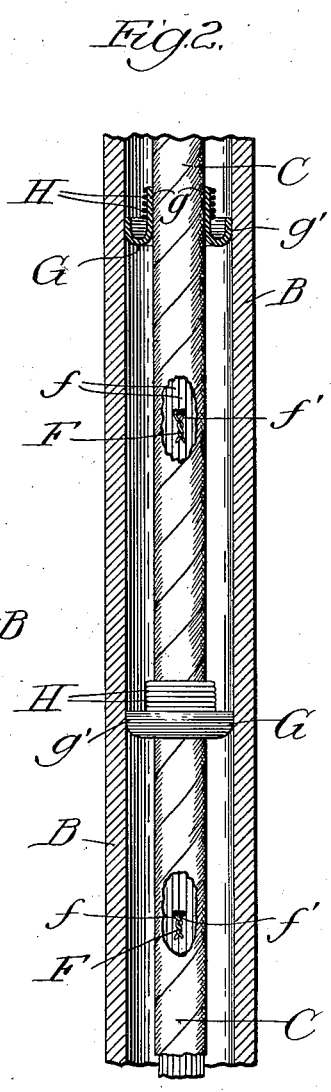
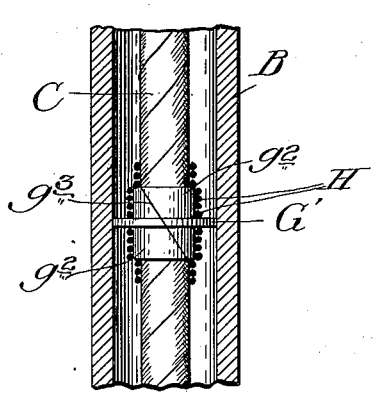
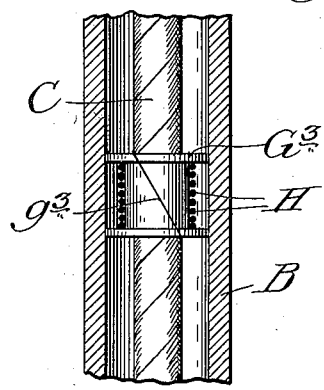
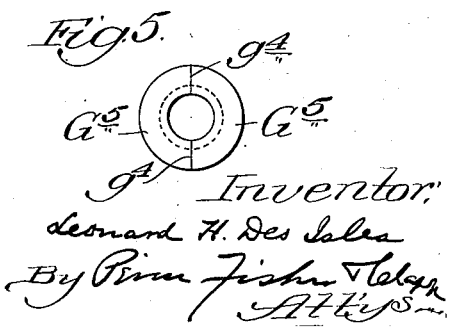
Inventor,
Leonard H. Des Isles
By Pim Fisher & Clapp
Attys

UNITED STATES PATENT OFFICE.

LEONARD H. DES ISLES, OF CHICAGO, ILLINOIS.

CABLE FOR THERMO-ELECTRIC CIRCUITS OF GRAIN-TANKS.

1,365,465.   Specification of Letters Patent.   Patented Jan. 11, 1921.

Application filed July 24, 1918. Serial No. 246,621.

*To all whom it may concern:*

Be it known that I, LEONARD H. DES ISLES, a citizen of the United States, and a resident of Chicago, in the county of Cook and State of Illinois, have invented certain new and useful Improvements in Cables for Thermo-Electric Circuits of Grain-Tanks, of which I do declare the following to be a full, clear, and exact description, reference being had to the accompanying drawing, forming a part of this specification.

In installing thermo-electric couplings in grain tanks in order to enable the temperature at different points within the tanks to be ascertained at its central station, it is customary to arrange the cables carrying the thermo-couplings within pipes or conduits that are suspended from the tops of the tanks; and in order to prevent the circulation of air through the conduits, it has been proposed to divide the conduits into a plurality of "dead air" chambers by means of plugs inserted into the conduit and through which plugs the cables are passed.

The object of the present invention is to provide a more convenient and effective means for forming the individual dead air spaces within the conduits, and to this end, the invention, broadly stated, consists in securing to the cables a plurality of disks (and by the term "disks" is meant any suitable device that will serve to divide the conduits into dead air chambers) which can be moved into the conduits when the cables are threaded or strung therein, and can be removed from the conduits with the cables when the latter are withdrawn. The invention also consists in novel features of improvement hereinafter described, illustrated in the accompanying drawing and particularly pointed out in the claims at the end of this specification.

Figure 1 is a diagrammatic view showing part of a grain tank with a conduit suspended from the top thereof and adapted to receive one of my improved cables. Fig. 2 is a detail view, partly in vertical section and partly in elevation, showing one embodiment of my invention. Fig. 3 is a view similar to Fig. 2, showing a modified form of the invention. Fig. 4 is a view similar to Fig. 3, showing a further modification of the invention. Fig. 5 is a plan view, showing a still further modification of the invention.

In Fig. 1 of the drawing, A designates the top of a grain tank or bin and B denotes one of the conduits carrying a cable C having wires for the thermo-couplings that will be arranged at suitable distances apart along the length of the cable. As shown, the conduit B is suspended from a box or casing D, from which extends a pipe section E through which the cable C or connection thereof will lead off. The several parts above described may be of the construction set forth in an application filed by me in the Patent Office under date of July 6, 1918, Serial No. 243,605 it being understood that the conduit B will be formed of sections, the lower end of the conduit being closed by a suitable cap $b$.

The cable C comprises the wires that form the thermo-couplings F that will be arranged at suitable distances apart throughout the length of the cable. The wires of the cable C will be copper and nickel wires $f, f'$, the terminals of each pair of wires being twisted or joined together to form the thermo-couplings F.

In order to divide the conduit B into a series of "dead air" chambers and so prevent a circulation of air through the conduit, I fix to the cable C a plurality of disks or partitions which, when the cable C is threaded or strung through the conduit, will bear against the interior wall of the conduit and thus prevent the circulation of air therein.

In the form of the invention illustrated in Fig. 2 of the drawing, the disks or partitions G are shown as comprising sleeves $g$ that fit around the cable C and are held securely thereon by threads or bands H tightly wound to the sleeves. From the sleeves $g$ extend laterally the cup-like portions $g'$ adapted to bear against the interior wall of the conduit B. The disks G and their sleeves $g$ may be formed of leather, rubber, or other suitable flexible material, although if leather be employed, it should be thoroughly oiled or treated to render it waterproof and durable. It will be observed that the number of conducting wires at different points of the cable C gradually decreases from the top of the cable to the bottom, depending upon the number of thermo-couplings F.

When the disks G are employed, as shown in Fig. 2, they will be threaded on to the cable,—that is to say, the cable will be passed through the disks and after the disks have been spaced at suitable distances apart, they will be fixed to the cable by bands or threads H. When the cable has thus been equipped with the disks or partitions G, it will be drawn through the conduit B and when in place within the conduit, the disks will divide the same into a plurality of "dead air" chambers and so prevent the circulation of air through the conduit, it being understood that the disks will be arranged in suitable number and in suitable relation with respect to the thermo-couplings F.

In the form of the invention illustrated in Fig. 3 of the drawing, the disks or partitions G' are shown as split disks, preferably of soft rubber, the purpose of thus forming the disks being to enable the disks to be conveniently placed laterally on the cable C and so avoid the necessity of threading the disks onto the cable. As shown in Fig. 3, the disk G' comprises sleeve-like portions $g^2$, $g^2$ that extend from the laterally projecting portion of the disk, these portions $g^2$ of the disk being securely held to the cable C by the threads or bands H. The slit $g^3$ of the disk G' is preferably formed diagonally of the disk from its periphery to its interior bore, although this is not essential.

In the form of the invention illustrated in Fig. 4 of the drawing, the disk $G^3$ is of spool-like shape. That is to say, the disk $G^3$ will comprise the central sleeve from the ends of which project laterally the portions that engage the interior wall of the conduit and thus serve as partitions to prevent the circulation of air in the conduit. The disk $G^3$ will be made of rubber or like flexible material and will be split, as in the construction illustrated in Fig. 3, so as to enable the disk $G^3$ to be readily placed laterally on the cable, after which it will be securely fixed in place on the cable by means of the threads or bands H.

If desired, the disks, instead of being merely split, as indicated in Figs. 3 and 4 of the drawing, may be formed of sections $G^5$, as shown in Fig. 5, in which case the disks may be divided diametrically, as indicated at $g^4$. In this form, the sections of the disk can be readily placed upon the cable and securely fixed thereto by threads or bands, as in the several forms of the invention hereinbefore described, it being understood that the construction illustrated in Fig. 5 of the drawings may be the same as that in Fig. 4, except that the slit is continued entirely through the disk or partition so as to divide the same into sections.

Not only does my invention possess the advantage of enabling the disks to be readily drawn into and removed from the conduit with the cable, but inasmuch as the disks are formed of flexible material, they will serve more effectively to fill the space between the cable and the inner wall of the conduit. Furthermore, the disks being formed of waterproof material and preferably of insulating material, more effectively serve to insulate the cable from the conduit and prevent any danger of short circuiting incident to the condensation of moisture within the conduit. Preferably, the disks will be normally slightly larger in diameter than the interior bore of the conduit so that they may snugly fit therein, but inasmuch as the material of the disks is resilient, they yield as the cable is drawn into or removed from the conduit. The portion of the cable within the lower part of the conduit will be somewhat smaller than that part of the cable in the upper portion of the conduit, as the number or pairs of wires contained in the lower part of the cable is less than in the upper part, but the resiliency of the disks and the fact that they are slightly larger in diameter than the bore of the conduit, insures an effective dividing of the conduit into dead air chambers throughout its length.

Having thus described my invention, what I claim as new and desire to secure by Letters Patent is:—

1. The combination of a rigid metal conduit, a cable therein comprising a plurality of insulated conductors and having thermoelectric couplings at spaced intervals lengthwise thereof, and a series of members on said cable at corresponding spaced intervals and projecting laterally therefrom into contact with the inner wall of said conduit to form dead air spaces about the cable, said members being securely fixed to said cable and having yielding peripheral portions to permit the threading of the cable through the conduit.

2. The combination with a metal conduit, of a cable movable therein comprising a plurality of conductors having a series of thermo-electric couplings at spaced intervals throughout the length of the cable, said cable having an insulating covering and having fixed thereto a plurality of disks spaced apart to form dead air chambers, said disks being formed of flexible material and having thin peripheral portions whereby the cable can be threaded through the conduit.

3. The combination with a metal conduit, of a cable adapted to be threaded therethrough and comprising a plurality of conductors having a series of thermo-electric couplings at spaced intervals throughout the length of the cable, said cable having fixed thereto a series of disks spaced apart to divide said conduit into dead air chambers, said disks having thin, flexible peripheral portions adapted to yield readily to permit the cable to be threaded through the conduit.

4. The combination with a metal conduit, of a cable adapted to be threaded therethrough comprising a plurailty of conducting wires and a series of thermo-electric couplings at spaced intervals throughout the length of the cable, said cable having fixed thereto at distances apart and movable therewith independently of the conduit a plurality of individual sleeves encircling and secured to the cable, said sleeves being provided with outwardly projecting peripheral portions adapted to bear against the inner wall of the conduit to form dead air spaces about the cable.

5. The combination of a metal conduit, a cable movable in and adapted to be threaded through said conduit and comprising a plurality of conductors having a series of thermo-electric couplings at spaced intervals throughout the length of the cable, and a series of sleeves of yielding material encircling and secured to the cables, said sleeves having outwardly projecting flexible annular portions to bear against the inner wall of the conduit and form dead air spaces about the cable.

6. The combination of a metal conduit, a cable adapted to be threaded therethrough comprising a plurilty of conductors having a series of thermo-electric couplings at spaced intervals throughout the length of the cable, said cable having fixed thereto at distances apart and movable therewith through the conduit a plurality of split disks adapted to be applied laterally to the cable.

7. The combination of a metal conduit, a cable adapted to be threaded therethrough comprising a plurality of conductors having a series of thermo-electric couplings at spaced intervals throughout the length of the cable, and a series of disks fixed to the cable and movable therewith through the conduit, said disks comprising portions extending lengthwise of the cable, and cords or bands surrounding said portions and binding them to the cable.

LEONARD H. DES ISLES.